Nov. 5, 1946.  C. W. CARROLL  2,410,629
SHUTTER DRIVE AND TIMING MECHANISM
Filed Aug. 8, 1945  3 Sheets-Sheet 1
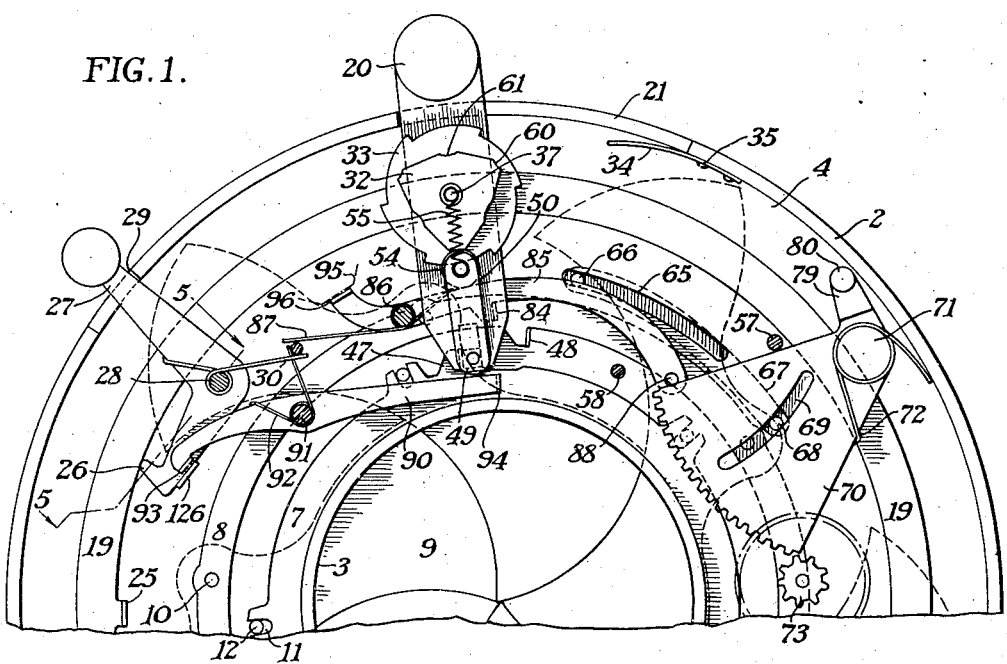
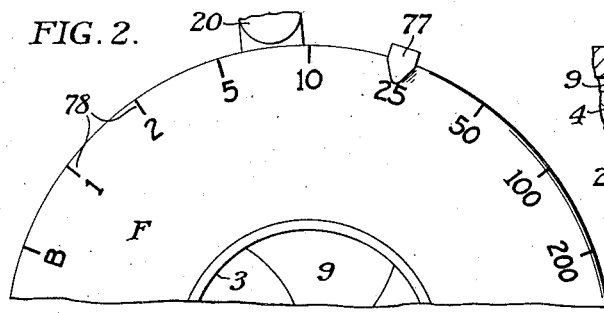
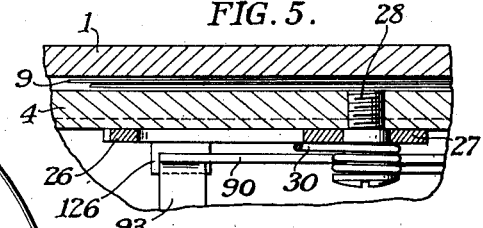
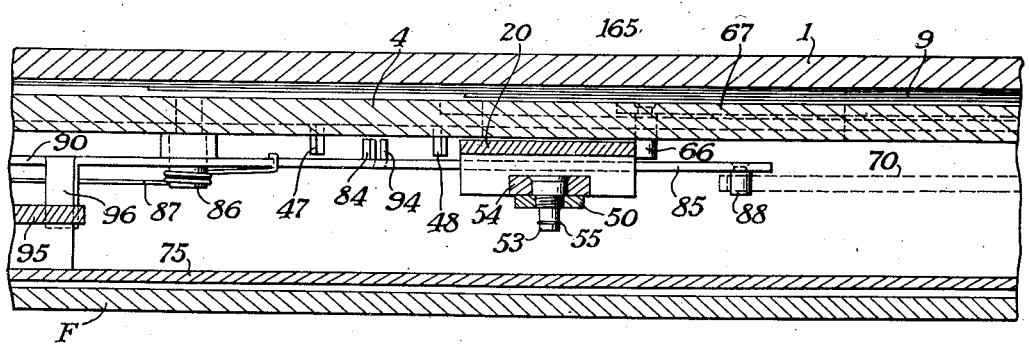
CLARENCE W. CARROLL
INVENTOR
BY
ATTORNEYS Nov. 5, 1946.  C. W. CARROLL  2,410,629
SHUTTER DRIVE AND TIMING MECHANISM
Filed Aug. 8, 1945  3 Sheets-Sheet 2
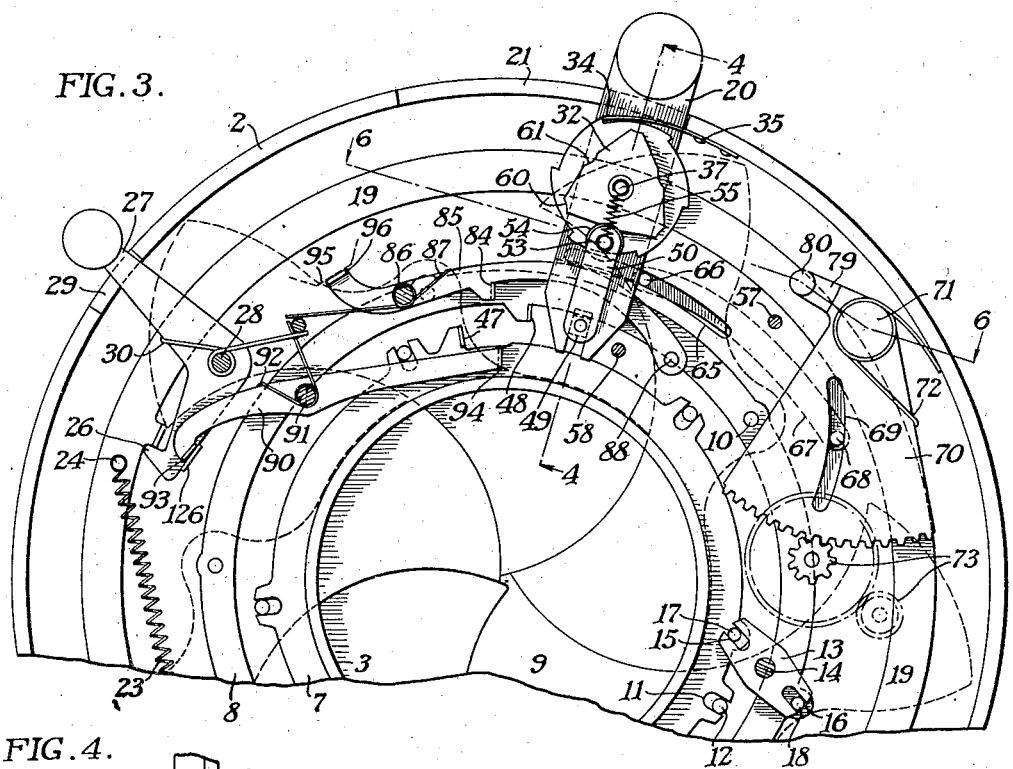
FIG. 3.
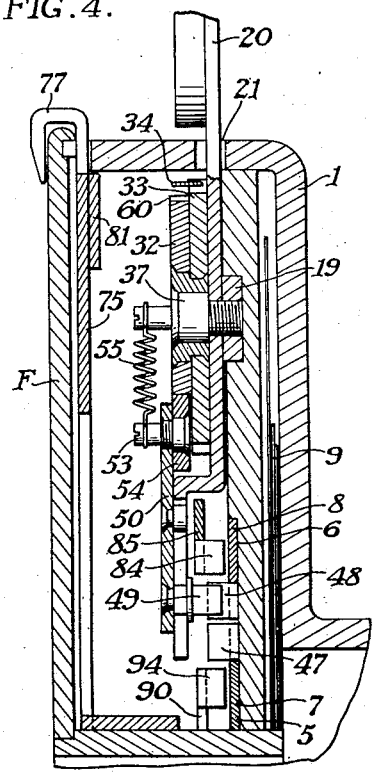
FIG. 4.
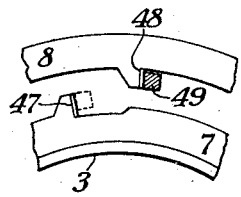
FIG. 7.
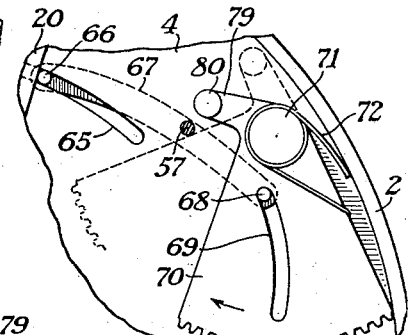
FIG. 8.
FIG. 9.
CLARENCE W. CARROLL
INVENTOR
BY
ATTORNEYS Nov. 5, 1946.  C. W. CARROLL  2,410,629

SHUTTER DRIVE AND TIMING MECHANISM

Filed Aug. 8, 1945  3 Sheets-Sheet 3

CLARENCE W. CARROLL
INVENTOR

BY
ATTORNEYS

Patented Nov. 5, 1946

2,410,629

UNITED STATES PATENT OFFICE 2,410,629

SHUTTER DRIVE AND TIMING MECHANISM

Clarence W. Carroll, Rochester, N. Y., assignor to Eastman Kodak Company, Rochester, N. Y., a corporation of New Jersey Application August 8, 1945, Serial No. 609,663

18 Claims. (Cl. 95—63)

This invention relates to camera shutters, and is particularly directed to means for enabling a shutter to be operated at any selected one of a number of speeds.

One object of my invention is to provide a mechanism with which a plurality of automatically timed exposures may be produced, such as from approximately 1/25 of a second through slower speeds such as 1 second to and including "bulb" exposures. Another object is to provide a spring actuated timing device for shutters including a pair of oppositely actuated blade rings which is effective regardless of which blade ring is the driven member. Another object of my invention is to provide a movable coupling which may drivingly connect the master member and timing mechanism. Still another object is to provide a simple coupling between the master member and the retard which may be positioned to engage in varying degrees or to be held free from engagement according to the setting of an exposure scale. Another object of my invention is to provide a shutter timer with a shutter speed scale having wide spaced graduations to facilitate selecting a desired exposure. And a still further object is to provide a novel coupling movable at will, for varying the relationship of a timing mechanism with a shutter mechanism of the type described. Other objects will appear from the following specification, the novel features being particularly pointed out in the claims at the end thereof.

A shutter in which this improvement may be embodied is shown in my pending U. S. application Serial No. 528,418, filed March 28, 1944, now Patent No. 2,398,409, dated April 16, 1946, and is of the type which has a plurality of symmetrical double-ended blades operated by two concentric blade-rings coupled together in such a manner that the shutter accomplishes a complete exposure each time either blade ring is actuated, that is, the shutter blades are moved from closed position to full-open position and then are moved farther in the same direction to closed position again. On the next operation of the shutter to produce a succeeding exposure, the blades are moved in a direction opposite to their movement for the preceding exposure, and therefore the blade rings which move the blades must also have their travel correspondingly reversed.

In this type of shutter the above action has been accomplished, prior to the invention set forth in the above-mentioned application, by various complicated mechanisms, including double-ended hooks, duplicate arrangements of detents, blocking bars, springs and cover blinds, etc. The structure disclosed in said pending application utilizes a simple ratchet mounted on a master member and so arranged that the cocking of the shutter turns the ratchet and automatically moves a driver pin into position to engage and move one blade ring, for instance the inner one, in a counterclockwise direction when the shutter is tripped, whereupon the master member carries the driver pin through the required travel, opening and closing the shutter in a uni-directional blade movement. When the shutter is recocked for the next exposure, by moving the master member clockwise, the ratchet on the master member is caused to move the driver pin into a different position so that it may engage the outer blade ring when the shutter is again tripped, and move said outer ring in a counterclockwise direction, (the same direction the inner ring was moved for the preceding exposure), thereby opening and closing the shutter by a single blade movement in the opposite direction from its movement in the first exposure. For a third exposure the driver pin is moved back to engage the inner ring; for the fourth, to the outer ring again, and so on in succession. During any recocking action the master member is always moved clockwise, and during any exposure action the master member is always moved counterclockwise, whichever ring is engaged by the driver pin.

The embodiment of the present invention illustrated and described herein contemplates the inclusion of means whereby the shutter blades may be caused to "dwell" in open position for a selected time interval in any exposure, regardless of the direction in which the shutter blades are moved. This dwell is preferably accomplished by intercepting either blade ring by means of suitable detents when the shutter blades have been moved to full open position, thereby stopping both blade rings (because they are coupled together), holding the intercepted blade ring stationary for the required interval, then removing the detents from intercepting position, so that the master member drive spring may close the shutter blades by moving the driven blade ring the remainder of its travel in the same direction in which it started.

In the drawings, wherein like reference characters denote like parts throughout:

Fig. 1 is an open front view of a shutter which includes the selector above mentioned and the timing mechanism forming the subject of this invention, the parts being in normal or post-exposure condition;

Fig. 2 is a small-scale partial exterior front view showing the time-selector scale;

Fig. 3 is a view similar to Fig. 1, the parts being in set or cocked position;

Fig. 4 is a vertical section through the master member and the shutter casing on line 4—4 of Fig. 3; on an enlarged scale;

Fig. 5 is a fragmentary horizontal section on line 5—5 of Fig. 1;

Fig. 6 is a horizontal large-scale section on line 6—6 of Fig. 3;

Fig. 7 is a fragmentary front view of a part of the blade rings, with the driver pin shown in engagement with the outer ring;

Fig. 8 is a fragmentary view of the timing mechanism in a position for a long exposure;

Fig. 9 is a similar view with the parts set for somewhat faster exposures, but not for "instantaneous";

Figure 10:
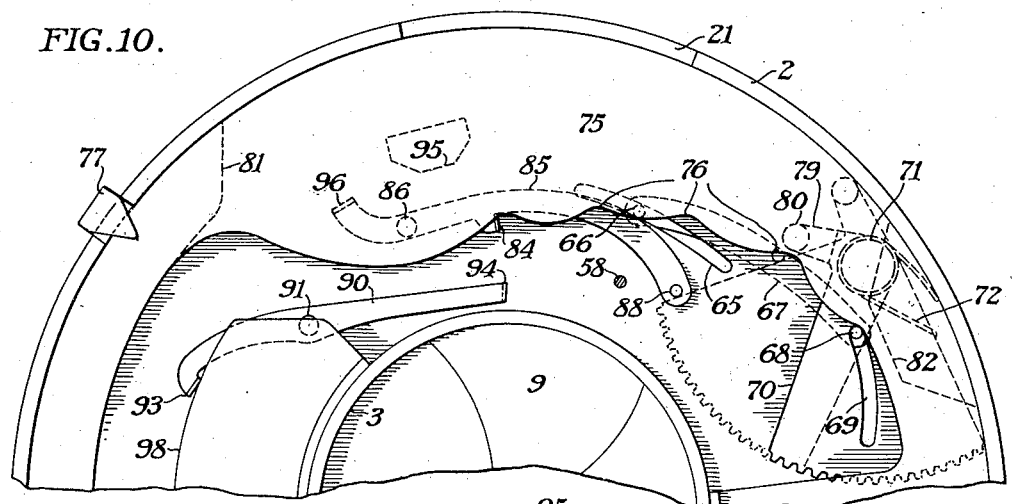
Fig. 10 is a front view of the timing cam, including the detents aforementioned.
Figure 11:
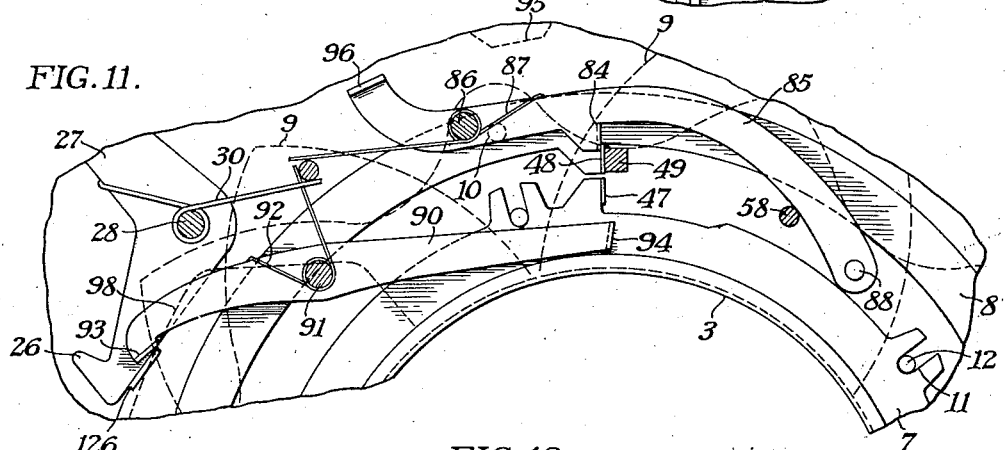
Fig. 11 is an enlarged fragmentary elevation showing the function of the detents during slow exposures, the shutter blades being fully opened.

As illustrated, the shutter may comprise a casing 1 having an annular upstanding flange 2 and an exposure aperture 3, a mechanism plate 4 being arranged as a mount for some of the operating members. The mechanism plate provides slideways 5 and 6 for concentric blade rings 7 and 8, the latter being connected with the double-ended symmetrical shutter blades 9 by pivots 10 in the outer ring 8 and by slots and pins 11—12 in the inner ring 7. These two blade rings are compelled to move in opposite directions in unison by reason of a rocker 13, pivoted at 14, which connects the rings through a slot-and-pin arrangement 15—16, 17—18. Thus whenever one of the rings 7 or 8 is moved counterclockwise, the other will be moved correspondingly clockwise, and vice versa. For instance, if the ring 8 is moved counterclockwise from the position of Fig. 1 the ring 7 will move clockwise, and this action will cause the blades 9 to move counterclockwise to uncover and then to cover the exposure aperture 3 in a one-way movement, producing one exposure. To produce a succeeding exposure, the ring 7 may be moved counterclockwise, which will result in a clockwise movement of the ring 8, and the blades 9 will again uncover and then cover the aperture 3, this time while rotating clockwise, the blades and the rings thus returning to their previous relations as in Fig. 1.

The master or actuating member may comprise a ring 19 mounted in plate 4, and movable by a handle 20 extending out through a slot 21 in the casing rim 2. Movement of this handle to the extreme right as in Fig. 3 cocks the shutter and automatically positions the driver pin hereinbefore mentioned. The master member spring 23 attached at 24 to ring 19 is tensioned during the cocking movement and when the handle 20 reaches the end of its cocking movement a lug 25 on ring 19 is caught by a hook 26 on a release lever 27 pivoted at 28 and having a finger piece extending through a slot 29. A spring 30 tends to retain these parts in latched position so that spring 23 (Fig. 3) remains tensioned until the release lever is tripped for an exposure.

As the handle 20 approaches the fully cocked position, moving toward the right, a leaf spring 34 attached to rim 2 at 35 engages one tooth of a ratchet 33 that is mounted to rotate on a stud 37 threaded into the handle 20 and the ring 19, and the completion of this movement causes the spring to force a partial revolution of the ratchet counterclockwise, to the extent of one tooth space. As the ratchet is so turned (60 degrees in the present case) it carries a selector 32 through the same movement, the selector being attached to the ratchet by the staked pin 37. The function of the selector will presently appear.

Figs. 4 and 7 indicate that the blade ring 7 is provided with an upwardly-extending lug 47 and the blade ring 8 has a similar downwardly-extending lug 48. Either of these lugs may be engaged and driven counterclockwise by the driver pin 49 when the latter is given an appropriate movement. The pin 49 is mounted in a slidable piece 50 guided in handle 20 and carrying a roller 54 on a stud 53. A spring 55 urges the roller into contact with one of a series of notches in the selector 32. Each alternate notch is farther from stud 37 than the intervening notches, the series 60 being farthest from, and the series 61 being closer to, the center of the selector so that the latter is in effect a cam capable of placing the pin 49 in a position to engage lug 47 on blade ring 7 at one movement of handle 20 and to engage lug 48 on blade ring 8 at the next movement of said handle in the same (clockwise) direction. Thus at each cocking operation the mechanism is conditioned to drive one blade ring, and in the next cocking movement the mechanism is reset to drive the other blade ring. Such movement, to produce an exposure, occurs when the lever 27 is depressed, the spring 23 then carrying master ring 19 around counterclockwise, and with it the handle 20, ratchet 33 and selector 32 with its associated parts, roller 54 and the driver pin 49.

As previously mentioned, one of the blade rings 7 or 8 must be stopped when the blades reach full open position and must be held while a suitable timing release operates, to produce selected exposures of the order of 1/25 second up to 1 second.

It has been found convenient to utilize the master member handle 20 as a prime mover to condition a timing mechanism for such operation. To this end a slot 65 in the mechanism plate 4 guides a pin 66 on one end of a link 67. This link may be movable in a recess in the back of plate 4 (see Fig. 6). A pin 68 in the opposite end of the link may be moved substantially radially in a slot 69 in a gear sector 70 by means of a cam 75 (Fig. 10). The sector 70 is pivoted at 71 and is urged in a clockwise direction by a spring 72, such movement being limited by a pin 57. The teeth of sector 70 engage a gear of a train 73, which, with the usual pallet escapement constitute a drag against the action of spring 72. The usual ratchet or slip clutch, not shown, may be included in the gearing in order to remove the drag when sector 70 is moved in a counterclockwise direction about pivot 71.

When handle 20 is moved to the right to cocking or set position its right edge meets pin 66 and pushes link 67, thereby swinging sector 70 as indicated in Fig. 8, against the torque of spring 72. Pin 66 travels the same distance in slot 65 each time, regardless of the position of pin 68, but the extent of the arcuate movement of sector 70, and therefore the amount of "windup" of the timing mechanism, varies in accordance with the distance of pin 68 from pivot 61, so that the nearer the pin is to the pivot the greater the arc traversed and the longer the time required for the sector to return (Fig. 8), while if pin 68 is down near the rim of the sector the latter obviously will be swung only a slight amount (Fig. 9) and will return sooner.

The position of pin 68 is determined by a cam 75 (Fig. 10) as above mentioned, and this pin may be held in contact with the cam by a suitable spring, not shown in the drawings. Each of the short control rises 76 on the cam covers the travel of pin 68 during the entire cocking movement of handle 20, and this design maintains the spacing of pin 68 from pivot 71 substantially constant throughout the cocking operation for any given time setting. The cam 75 may be rotated in casing 1 by the usual finger index 77, suitable calibrations 78 being provided on a front cover F.

The sector 70 carries an arm 79 with a pin 80 which is adapted to be engaged by portions 81 and 82 of cam 75 whenever the index 77 is at 1/50 or higher speeds, or at "bulb," respectively, so that the timing mechanism will be held inoperative at these settings.

The means by which master member handle 20, ring 19, and pin 49 are stopped to hold the shutter blades full open for slow or for "bulb" exposures includes a detent 85 pivoted at 86 and urged clockwise by a spring 87, and another detent 90, pivoted at 91 and urged counterclockwise by a light spring 92. Detent 85 has a downwardly-extending lug 84 adapted to engage lug 48 on blade ring 8, regardless of which way said ring is moving. If ring 8 is being driven by pin 49, (always counterclockwise) the lug 84 will intercept the lug 48 at its left side, while if ring 7 is being driven by pin 49, ring 8 and lug 48 will be moving clockwise by reason of the coupling lever 13, and therefore lug 84 will catch the right side of lug 48. In either case both rings will be stopped with the shutter blades fully opened.

Although the position of lug 48 when it is caught by the left side of lug 84 as ring 8 moves clockwise will not absolutely register with the position it will occupy when caught by the right side of lug 84 as the ring 8 moves counterclockwise, these positions differ only by the thickness of lug 84, which may be made of very thin metal. The shutter blades 9 may be designed to take care of this small difference, so that in either position the aperture 3 will be entirely unobstructed.

The detent 90 has a lug 94, similarly adapted to intercept lug 47 on ring 7, whichever way the latter is moving, and thereby hold the shutter blades in full open position. The relation of both the abovementioned detents and their functions will now be explained in detail.

The cam 75 carries a short bump 95 which depresses the out-turned end 96 of detent 85 when the indicator 77 is at "B." A portion on the cam, not shown, also operates similarly when the indicator is set at 1/50 or higher speeds. At all speeds between these settings, spring 87 is able to depress detent 85 downwardly so that lug 84 will intercept lug 48 whenever the master member handle 20 is released by lever 27. The duration of this interception is determined by the action of the timing mechanism previously described.

As sector 70 reaches nearly the end of its unwinding (clockwise) movement, its leading edge strikes a pin 88 in the right end of detent 85, and during the last few degrees of movement raises this pin and thereby lifts lug 84 clear of lug 48. This action may occur, as before mentioned, irrespective of the direction of movement of ring 8. As soon as lug 84 is clear of lug 48 the main drive spring 23 may close the shutter.

Detent 90 functions only when a "bulb" exposure is desired, and at all other settings is held inoperative by a portion 98 on cam 75 (Fig. 10) which, by contacting a lug 93, keeps the latter above a lug 126 on release lever 27 and also holds lug 94 below and clear of lug 47 on blade ring 7.

Figure 12:
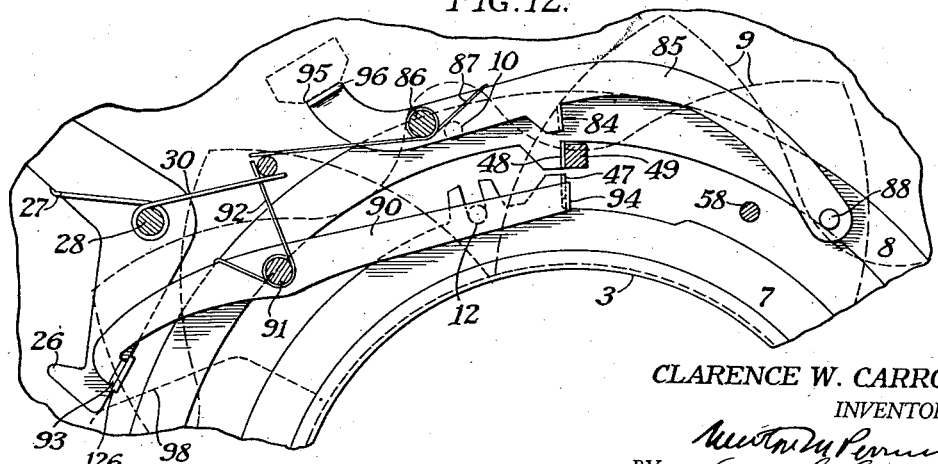
Fig. 12 is a similar view showing the detents in position during the so-called "bulb" exposure.

When the cam portion 98 is moved clear of lug 93, which will be only when indicator 77 is at "B," spring 92 causes detent 90 to rotate slightly counterclockwise and thereby allows lug 94 to rest on lug 126 of release lever 27. Spring 92, being very light, has no operative effect on the heavy spring 30, so that lug 94 still lies below and clear of lug 47 until release lever 27 is depressed, whereupon spring 92 will cause lug 94 to rise and intercept lug 47 as in Fig. 12. As soon as release lever 27 is allowed to return to normal, spring 30 overcomes spring 92 and moves detent 90 clockwise again removing lug 94 from the path of lug 47. The shutter then closes immediately by action of spring 23.

If pin 49 happens to be driving the lug 47 the left side of this lug will strike the right side of lug 94, while if the pin is driving lug 48, lug 47 will be moving clockwise, the pin will be out of its path, and lug 47 will then be intercepted by the left side of lug 94.

Obviously the arrangement of detents 85 and 90 might differ from that shown herewith without departing from the scope of the invention. The bulb detent for instance could be arranged to intercept lug 48 and the time detent to intercept lug 47. The invention is intended to include any practical design in which either one of a pair of oppositely moving blade-operating rings may be intercepted for a controlled time interval by one or the other of two detents, or, conceivably, by different parts of one detent, for the purpose of prolonging an exposure in accordance with the operator's selection.

When the shutter is set or "cocked," and the lever 27 is depressed, the master spring 23 moves handle 20 and the selector parts to the left very rapidly. As pin 49 has an appreciable movement before contacting either of lugs 47 or 48 (Fig. 3) it will have acquired considerable speed, so that the shutter is opened almost instantly. On the higher speeds, when parts of cam 75 are holding sector 70 in the position of Fig. 10 and the detents 85 and 90 inoperative, the exposure may be very short indeed, as it is completed by one unidirectional movement of the shutter blades. The latter therefore do not have to be reversed to complete an exposure. The blades as set forth above may make one exposure by a clockwise rotation and the next exposure by a counterclockwise rotation.

The movement of the master member is extremely rapid. It cannot be retarded by the sector 70, because the latter is not positively connected to the handle 20. Because the total inertia of the master member parts is low the shutter is moved from closed to open and from open to closed position almost instantaneously which is one advantage of the construction illustrated.

The mechanism above described permits exposures of varying lengths to be obtained in a shutter that has symmetrical double ended blades, and includes mechanism for moving these blades in a clockwise direction to accomplish one exposure of any selected time duration and in a counterclockwise direction for the next exposure, while for either movement of the blades a master member is moved in only one direction for cocking the shutter, and in only one direction while driving the shutter. The timing device permitting exposures from approximately $1/25$ of a second to the customary one second is so constructed and arranged that it may be retained in position to variably engage the shutter actuating mechanism or it may be moved from an engaging position to one in which the shutter mechanism may operate free from any restraint for high speed exposures. The timing mechanism is simple in construction and operation and may be readily controlled by a cam. Moreover the cam may be designed for relatively large extent of movement permitting very desirable spacing of the exposure indicating numerals of the shutter speed scale. This greatly facilitates even spacing and easy setting.

While speeds above $1/50$ second are indicated in Fig. 10, no provision for actuating the shutter at these speeds has been described in this specification, as it forms no part of the present invention. The invention as a whole, and the design of individual members, is capable of considerable modification, and should not be construed as limited to the exact construction illustrated, but rather should be interpreted according to the terminology of the following claims.

I claim:

1. A photographic shutter having a casing, an exposure aperture, a pair of coupled blade-operating rings, symmetrical shutter blades pivotally connected with said rings, a spring-driven master member carrying a driver and means for automatically positioning said driver on the master member during a setting movement of the latter, a part on each ring so arranged that one ring may be engaged by the driver and moved thereby in one direction to produce an exposure when the master member is released, and the other ring may be engaged and moved by said driver in the same direction to produce a succeeding exposure, a timing mechanism adapted to be wound during the setting movement of the master member, a cam adapted to control the winding of the timing member, and detents positioned by said cam and each adapted to intercept one blade ring when the shutter blades are open.

2. A photographic shutter having a casing, an exposure aperture, a pair of coupled blade-operating rings, symmetrical shutter blades pivotally connected with said rings, a spring-driven master member carrying a driver and means for automatically positioning said driver on the master member during a setting movement of the latter whereby one ring may be driven in one direction by the driver to produce an exposure when the master member is released and the other ring may be driven in the same direction to produce a second exposure upon the next release of the master member, a release member, a timing mechanism adapted to be tensioned by the master member during said setting movement, detents arranged to intercept one ring when the shutter blades are opened, means for selectively positioning said detents, and means associated with the timing mechanism and with the release member adapted to move said detents to permit the master member and the ring to complete a blade-closing movement.

3. A photographic shutter having a casing, an exposure aperture, a pair of coupled blade-operating rings, symmetrical shutter blades pivotally connected with said rings, a spring driven master member, a release member, automatically positioned driving means carried by the master member and adapted to engage one ring to produce an exposure during one release movement of the master member and to engage the other ring to produce a second exposure during the next succeeding release movement of the master member, a timing mechanism, a detent adapted to intercept one ring to produce a timed exposure and to be disengaged from said ring by a portion of the timing mechanism, a second detent adapted to intercept the other ring, means associated with the release member for moving said second detent, and means for selectively positioning said detents as required.

4. A photographic shutter having a casing, an exposure aperture, a pair of coupled blade-operating rings, symmetrical shutter blades pivotally connected with said rings whereby movement of one ring in one direction produces an exposure by a unidirectional movement of said blades and movement of the other ring in the same direction produces a succeeding exposure, a master member spring-driven in one direction and manually settable in the opposite direction, a selector carried by the master member and operable during the setting movement of the latter, a driver positioned by the selector to drive either ring in one direction as aforesaid after the master member is released, a spring-driven timing mechanism adapted to be wound by the master member during its setting movement, detents adapted to intercept the blade-operating rings in their open position, and means for positioning both detents as required.

5. A photographic shutter having a casing, an exposure aperture, a pair of coupled blade-operating rings, symmetrical shutter blades pivotally connected with said rings whereby movement of either ring in one direction causes a uni-directional movement of said blades to produce an exposure, a settable master member including a latch and a release lever therefor, a driver carried by the master member and adapted to engage and to move one ring in one direction when the master member is released and to engage and to move the other ring in the same direction when the master member is next released, a selector automatically operable to position the driver during the setting movement of the master member for driving the required ring, a timing mechanism tensioned by the master member, and detents adapted to selectively intercept one ring when the shutter blades are open during an exposure, said detents being movable respectively from intercepting position by the timing mechanism and by the release member.

6. In an exposure controller for shutters having a casing, shutter blades, a manually settable master member including a latch and a release lever, and mechanism for operating the blades from the master member, the combination with said master member of a timing mechanism, a link having pin and slot connections with the timing mechanism, a cam for moving said link relatively to said mechanism, a part on said link adapted to be engaged by the master member during its setting movement to tension the timing mechanism and to be freed from the master member when the latter is released, and detents adapted to intercept the blade operating mechanism when the shutter blades are open, said detents being controllable respectively by the timing mechanism and by the release lever.

7. A photographic shutter having a casing, an exposure aperture therein, a pair of coupled blade-operating rings, blades pivotally connected with said rings and adapted to produce an exposure when a selected ring is moved in one direction, a master member spring-driven in one direction and settable in an opposite direction, a selector, a driver automatically positioned by the selector during the setting movement of the master member to drive the required ring, a timing mechanism, adapted to be set by a link movable by the master member and connected with one member of the timing mechanism, a cam having spaced concave link-locating surfaces engaging a portion of said link for selected exposures, a detent adapted to intercept one blade ring, a part on said cam adapted to position said detent to intercept said ring, and a part on said timing mechanism adapted to free said detent from said ring.

8. A shutter drive and timing mechanism in a shutter constructed according to claim 7, in which the spacing of the concave link-positioning surfaces corresponds to the distance the link is moved by the master member.

9. A shutter drive and timing mechanism in combination with a shutter constructed according to claim 7 in which the link is moved by the master member when the latter is being set, but is not positively connected with the master member, whereby the master member may move, when released, without moving the link or the timing mechanism.

10. A shutter drive and timing mechanism in combination with a shutter constructed according to claim 7, in which the cam is adjustable and has link-locating recesses spaced apart sufficiently so that a scale having characters similarly spaced is readily readable to facilitate determination of a selected exposure.

11. A construction according to claim 7 characterized by said cam for controlling the link and a member of the timing mechanism including a mount on which the cam may oscillate about a center, and a cam surface having spaced concave (with respect to the center) link locating surfaces for predetermined exposures, and including a plurality of convex (with respect to the center) guiding surfaces between the concave surfaces.

12. In a photographic shutter of the type including a casing, an exposure aperture therein, symmetrical shutter blades to provide an exposure in moving in one direction to and from the exposure aperture, and a pair of blade rings to which each shutter blade is attached, the combination with said blade rings, of a master member spring driven in one direction, means for setting the master member by moving it in an opposite direction a blade-ring driver, a selector carried by the master member for positioning the driver to engage alternately one blade ring at a time, a timing mechanism, a spring tending to move the retard mechanism in one direction, and movable connections between the master member and the timing mechanism for setting the latter by the former irrespective of the position of the driver and the blade ring to be driven thereby.

13. In a photographic shutter of the type including a casing, an exposure aperture therein, symmetrical shutter blades to provide an exposure in moving in one direction to and from the exposure aperture, and a pair of blade rings to which each shutter blade is attached, the combination with said blade rings, of a master member spring driven in one direction, means for setting the master member by moving it in an opposite direction, a driver adapted to engage and drive one blade ring in one direction when the master member is released and to engage and drive the other blade ring in the same direction upon the next succeeding release of the master member, each of such releases producing an exposure, a selector adapted to automatically position the driver in required relation to a ring during any setting movement of the master member, a timing mechanism, a part movable by the master member to wind said mechanism, a detent movable into the path of one ring to intercept the latter at mid-travel, and a part movable during the unwinding of said mechanism to disengage said detent.

14. A photographic shutter having a casing, an exposure aperture, symmetrical shutter blades mounted on concentric rings and adapted to produce an exposure by a uni-directional movement either clockwise or counterclockwise, a spring-driven master member and a latch therefor, a driver carrier by the master member and automatically positioned at each setting of the master member to engage a required ring and drive it in one direction, a spring driven timing mechanism, a cam, a link movable by the master member to tension said timing mechanism by moving one member thereof in accordance with the position of said cam, a detent adapted to arrest one blade ring when the shutter blades are open, and means whereby the member of the timing mechanism moved by said link may release said detent.

15. A photographic shutter having symmetrical blades uniformly spaced around an exposure aperture and movable either clockwise or counterclockwise to produce an exposure, concentric rings coupled together and having pivotal mountings for said blades, mechanism capable of driving either ring in one direction only for producing an exposure, said mechanism being so arranged that if the inner ring is driven for one exposure the outer ring is driven for the next exposure, means for conditioning the ring driving mechanism to automatically select the ring required to be driven, a master member carrying the ring driving and conditioning mechanism, a latch for holding the master member in setting position, an adjustable member movable by the master member during a movement of the latter to setting position, a timing mechanism adapted to be wound by movement of the adjustable member and to control exposures of predetermined lengths when unwinding, means for arresting one blade ring after the master member is released and when the shutter blades are in open position, and means connected with the timing mechanism for freeing said ring after the elapse of a selected time interval.

16. A photographic shutter including in combination, a casing having an exposure aperture therein, two blade rings movably mounted in the casing, a coupling between the blade rings for moving the blade rings in opposite directions, symmetrically shaped shutter blades for normally covering the exposure aperture and uncovering and covering the exposure aperture when moved in one direction, each shutter blade being operably connected to each of the blade rings, a master member having movement in one direction for driving and in the opposite direction for setting, a driver for transmitting motion from the master member to one blade ring for making an exposure, means for automatically shifting the driver for transmitting motion to the other blade ring for the next successive exposure, and means for momentarily delaying movement of the blade rings moving under the impulse of the driver when the shutter blades are open including a spring-actuated timing mechanism adapted to be wound to a preselected condition by movement of the master member to setting position, a cam arranged to limit said winding, a detent adapted to intercept a blade ring, and a part on said timing mechanism adapted to move said detent from such intercepting position during the unwinding of the timing mechanism.

17. A photographic shutter having symmetrical blades pivotally mounted on coupled blade-operating rings movable simultaneously in opposite directions, means for setting and releasing the shutter, a driver movable with the setting means and automatically positioned during one setting movement to engage and drive one ring in one direction to produce an exposure, means to automatically shift the driver during the next setting movement to engage and drive the other ring in the same direction to produce the next exposure, detents adapted to intercept the rings when the blades are open, a control cam engaging the detents, a timing mechanism adapted to be wound during any setting movement and adapted to disengage one detent after a selected time interval, and a part connected with the releasing means to disengage the other detent.

18. A photographic shutter having a casing, an exposure aperture, symmetrical shutter blades, operating rings for said blades coupled together in such manner that movement of either ring in one direction produces an exposure, a spring-actuated master member movable in one direction to set the shutter and in an opposite direction to operate the shutter, a driver carried by the master member, means automatically operable during a setting movement of the master member to register the driver with the ring required to be driven, a spring-actuated timing mechanism, a link movable by the master member, a cam governing the action of said link whereby the latter produces a variably wound condition of the timing mechanism, a detent adapted to engage a ring to hold the shutter open, and means operated by the timing mechanism when unwinding to disengage said detent.

CLARENCE W. CARROLL.